(12) United States Patent
Kim

(10) Patent No.: US 7,041,895 B1
(45) Date of Patent: May 9, 2006

(54) STREAMER DISCHARGE TYPE LIGHTENING ROD CAPABLE OF GENERATING LOTS OF IONS

(76) Inventor: Dong-Jin Kim, 1677-7 Bongcheon-Dong Kwanak-Gu, Seoul (KR)

( * ) Notice: Subject to any disclaimer, the term of this patent is extended or adjusted under 35 U.S.C. 154(b) by 38 days.

(21) Appl. No.: 10/908,978

(22) Filed: Jun. 2, 2005

(30) Foreign Application Priority Data

Nov. 3, 2004 (KR) ............... 10-2004-0088738

(51) Int. Cl.
*H02G 13/00* (2006.01)

(52) U.S. Cl. ............... 174/3; 174/2; 174/5 R; 174/5 SG

(58) Field of Classification Search ............ None
See application file for complete search history.

(56) References Cited

U.S. PATENT DOCUMENTS 5,478,451 A * 12/1995 Riffe ............... 205/735
5,694,286 A * 12/1997 Fowler et al. ............ 361/220
6,069,314 A * 5/2000 Varela ............... 174/3

* cited by examiner

*Primary Examiner*—Jinhee Lee
(74) *Attorney, Agent, or Firm*—IPLA P.A.; James E. Bame

(57) ABSTRACT

A streamer discharge type lightening rod is disclosed, which is capable of generating lots of ions so that a certain object can be effectively protected from lightening in such a manner that an induction current is formed using ions in the air as thundercloud is formed, and ions having polarities corresponding to the ions in the air are greatly generated at a surface of the lightening rod, and a streamer by a corona discharge is increased at a surface of the thundercloud for thereby inducing lightening from a thundercloud similar to when lightening is naturally generated.

6 Claims, 4 Drawing Sheets

STREAMER DISCHARGE TYPE LIGHTENING ROD CAPABLE OF GENERATING LOTS OF IONS

BACKGROUND OF THE INVENTION

1. Field of the Invention

The present invention relates to a lightening rod capable of generating ions from a surface of the same, and in particular to a streamer discharge type lightening rod capable of generating lots of ions in such a manner that an induction current is generated using ions in the air of which the amount is increased as a thundercloud is developed, and lots of ions are discharged using a streamer at a surface of a lightening rod for thereby inducing lightening from a thundercloud.

2. Description of the Background Art

Generally, a magnetic field is changed in an area having a thundercloud that is capable of inducing lightening, and the above magnetic field is increased up to about 5~30 kV/m, so that an electric potential between the thundercloud and ground becomes a few tens of millions in volts.

The air is ionized by an electric potential between the thundercloud and ground, and the ions having opposite polarities corresponding to the ions in the air positioned at the protruded portions of the ground is increased. In the above state, as the thundercloud is increased, ions are radiated by a corona effect at the protruded portions.

The lightening rod is designed to induce lightening based on the above principle, namely, in such a manner that when thundercloud is increased, a corona discharge is formed at a tip of a lightening rod for thereby radiating ions with the tip being exposed in the air at a certain height.

In the European patent No. 0228984, an air spark-gap lightening rod is disclosed, which is surrounded by a metallic hollow cell and is grounded. One end of the rod is grounded, and the other end of the same has a tip. The tip is exposed to the outside through a circular opening formed at the hollow cell. The hollow cell is insulated from a metallic rod by the air, and the air gap defines the circular opening of the cell and the tip of the rod. Furthermore, it is needed to connect with a central rod based on an isolation resistance of high impedance.

Therefore, when thundercloud approaches a nearby lightening rod, and moving-down lightening reaches near the lightening rod, spark is formed at the cell and is moved to the tip of the rod for thereby reaching at a critical electric potential, so that metallic cells are charged.

However, the spark is randomly generated at both ends of the gap between the rod and the metallic cell based on a premature manner at the tip of the rod.

In the European patent No. 0096655, a lightening rod includes a grounded rod, a first part that is extended in a radial direction with respect to the rod for thereby easily capturing a large electric potential, and a second part that is distanced from the first part and forms a polarity extended in a direction of the rod along a curved path near the rod. In addition, the lightening rod includes an electric conductor so that electric discharge occurs between an electrode and a rod when storm occurs.

However, the installation methods of the above two lightening rods are so complicated, and it is impossible to achieve desired operation effects.

SUMMARY OF THE INVENTION

Accordingly, it is an object of the present invention to overcome the above-described problems encountered in the conventional art.

It is another object of the present invention to provide a streamer discharge type lightening rod capable of increasing lots of ions having a certain polarity corresponding to the ions in the air at a surface of a lightening rod as thundercloud is developed for thereby effectively inducing lightening.

It is further another object of the present invention to provide a streamer discharge type lightening rod capable of generating lots of ions so that a certain object can be effectively protected from lightening in such a manner that an induction current is formed using ions in the air as thundercloud is formed, and ions having polarities corresponding to the ions in the air are greatly generated at a surface of the lightening rod, and a streamer by a corona discharge is increased at a surface of the thundercloud for thereby inducing lightening from a thundercloud similar to when lightening is naturally generated.

To achieve the above objects, there is provided a streamer discharge type lightening rod capable of generating loss of ions, comprising a lightening conducting unit that is formed of a conductive tip at an upper most portion of a lightening rod; a lightening protecting unit that is installed at a lower side of the lightening conducting unit and has at least one conical skirt with a lower side of the same getting wider and wider; an insulation unit that is installed at a lower side of the lightening protection unit and is formed of an insulation material on its surface and has an internal portion formed of a metallic material with a current being supplied to the lightening protection unit; and a body that is installed at a lower side of the insulation unit with its lower side being connected with the ground for conducting lightening current to the ground and has an ion generation circuit installed in the interior of the same for generating ions, wherein said ion generation circuit includes an electric potential generation unit for detecting a magnetic field variation in real time between the ground and thundercloud generated by electrostatic induction when thundercloud is developed and for generating induction current; an energy storing unit for charging electric charge into the interior of the same when induction current is generated at the electric potential generation unit with one end of the same being connected with the ground, and with the other end of the same being connected with the electric potential generation unit; a switching unit that opens the circuit when electric charge is fully charged into the energy storing unit and moves the electric charges of the energy storing unit to an upper side of the lightening rod and closes the circuit when the electric charges are charged into the energy storing unit with one side of the same being connected with the energy storing unit, and with the other side of the same being connected with an upper side of the lightening rod; and an oscillator that amplifies the current inputted as the switching unit is opened and generates a high voltage in the interior of the same and induces the high voltage to the upper most side of the lightening rod with one side of the same being connected with the switching unit, and with the other end of the same being connected with the upper most side of the lightening rod.

Preferably, induction current is formed with a first inductance at one side of the electric potential generation unit, and the energy storing unit uses a capacitance, and the oscillator generates a high voltage using the second and third inductances.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS

The streamer discharge type lightening rod capable of generating lots of ions according to the present invention will be described. The lightening rod according to the present invention operates in response to a thundercloud of positive and negative polarities. In the present invention, the thundercloud having a negative polarity will be described.

Figure 1:
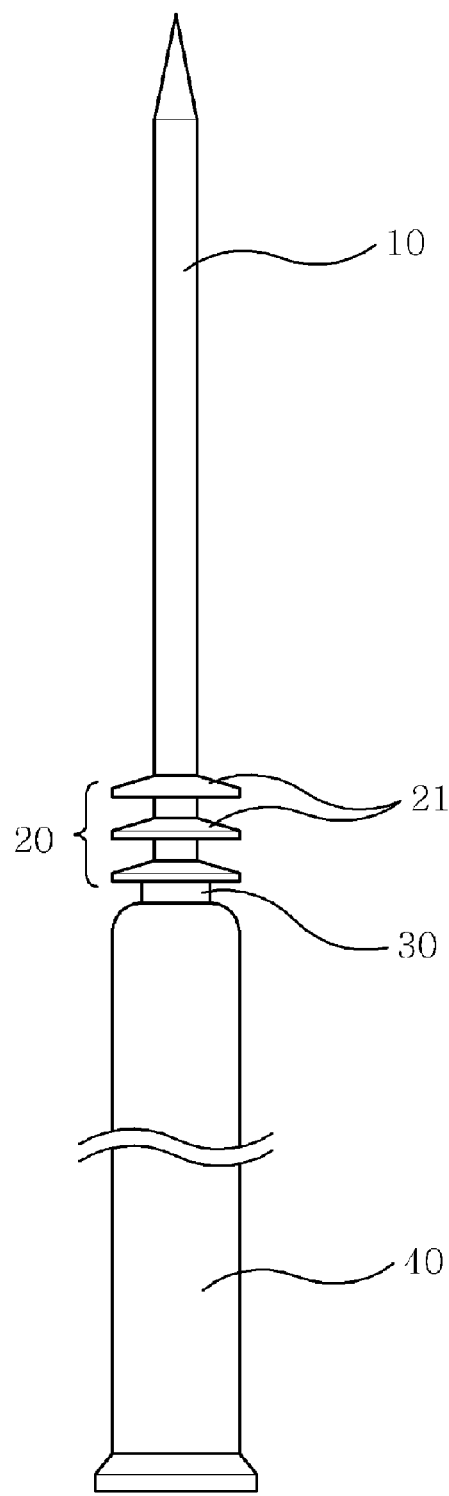
FIG. 1 is a perspective view illustrating a streamer discharge type lightening rod capable of generating lots of ions according to an embodiment of the present invention.
Figure 2:
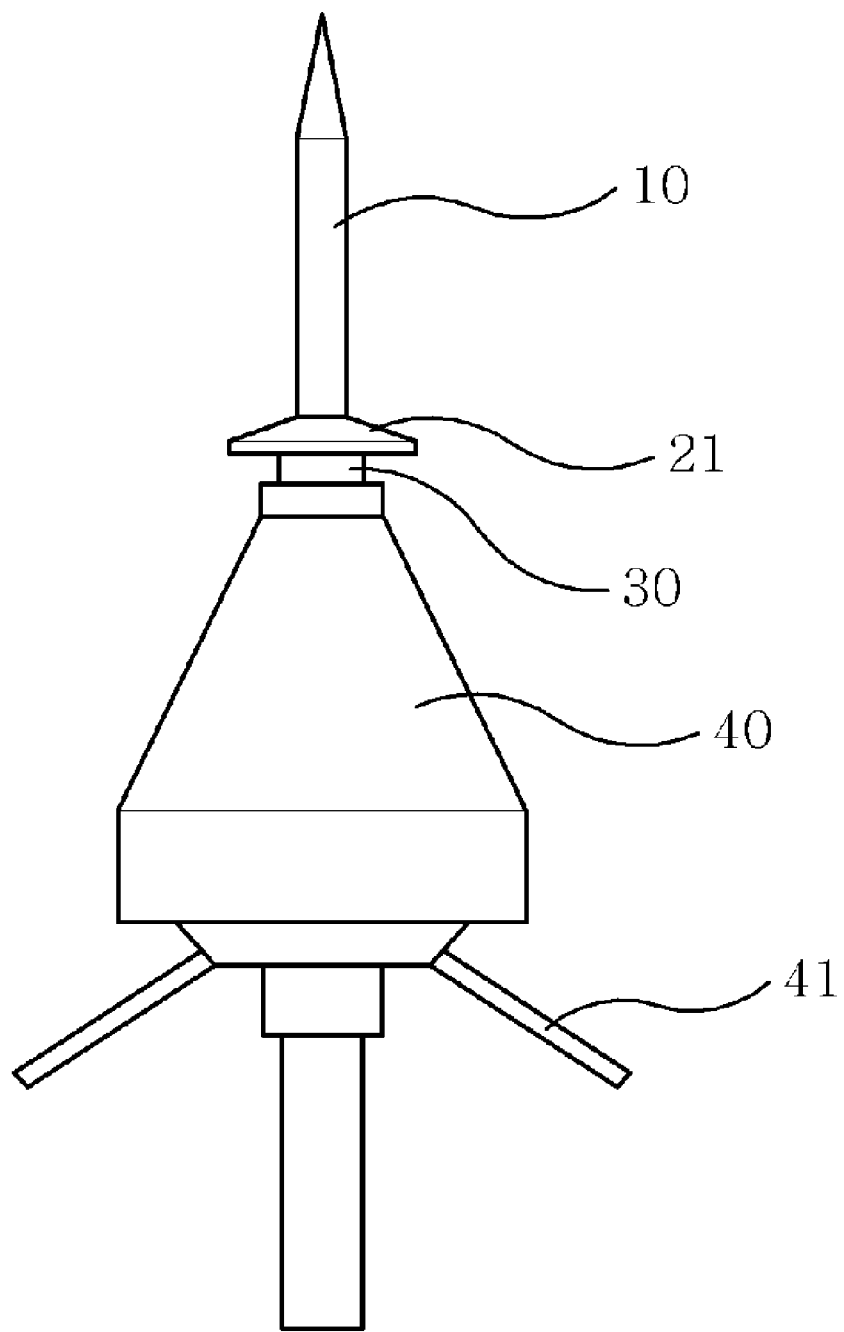
FIG. 2 is a perspective view illustrating a streamer discharge type lightening rod capable of generating lots of ions according to another of the present invention.
Figure 3:
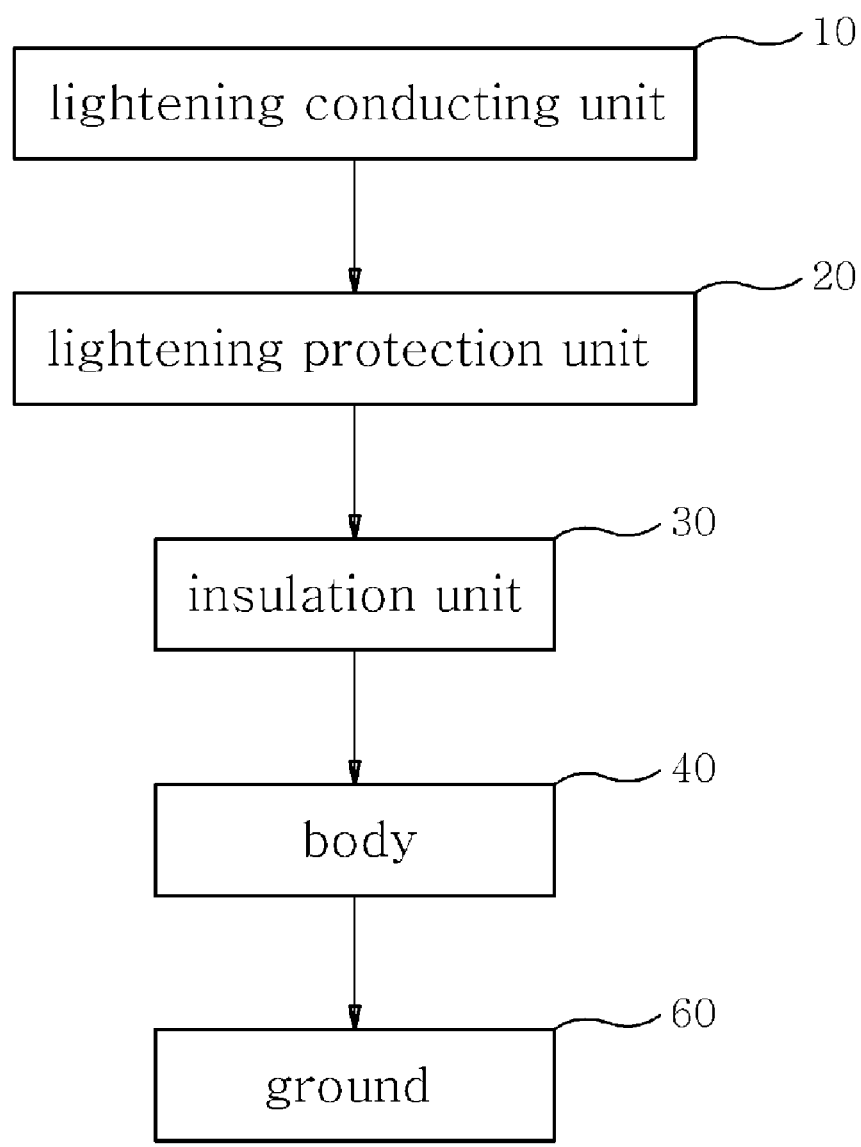
FIG. 3 is a block diagram illustrating a streamer discharge type lightening rod capable of generating lots of ions according to the present invention.
Figure 4:
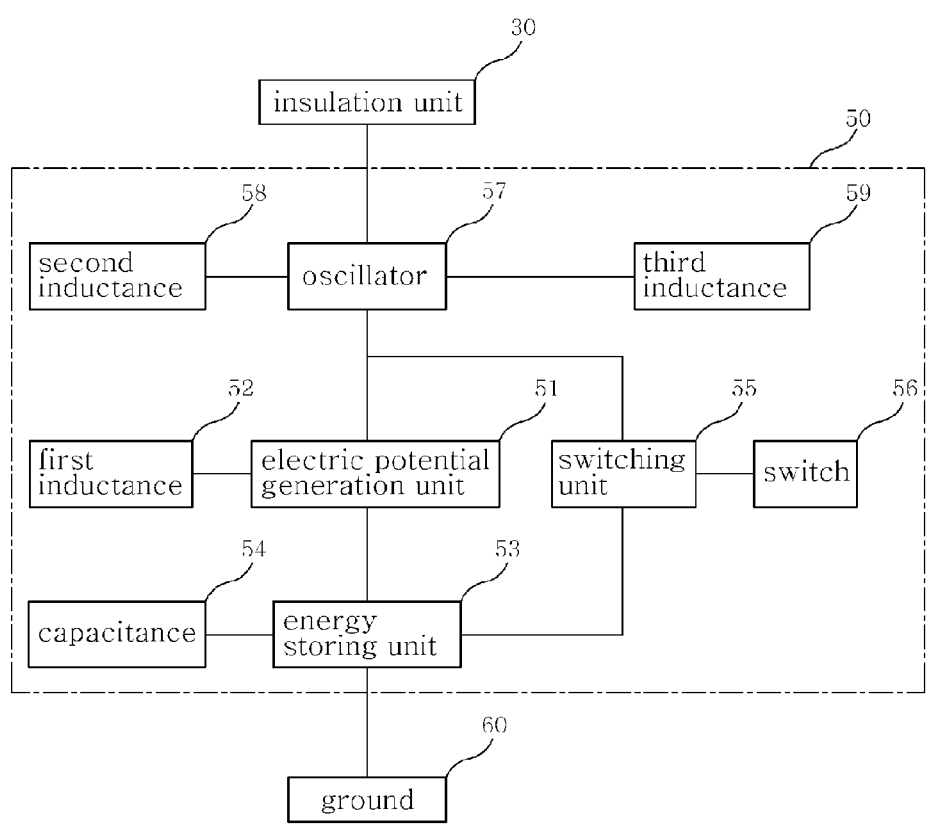
FIG. 4 is a block diagram of an ion generation circuit according to the present invention.

FIG. 1 is a perspective view illustrating a streamer discharge type lightening rod capable of generating lots of ions according to an embodiment of the present invention. FIG. 2 is a perspective view illustrating a streamer discharge type lightening rod capable of generating lots of ions according to another of the present invention. FIG. 3 is a block diagram illustrating a streamer discharge type lightening rod capable of generating lots of ions according to the present invention. FIG. 4 is a block diagram of an ion generation circuit according to the present invention.

As shown in FIGS. 1 through 3, a lightening conducting part 10 is formed at an upper most portion of a lightening rod. The lightening conduction unit 10 is made of a conductive tip.

Here, the lightening conducting unit 10 is made of a stainless steel having a certain thermal strength and mechanical strength in a conductive tip shape in order to induce a positive corona discharge formed as lightening cloud is formed, a magnetic field intensity at a ground surface is increased up to 5 kV/m.

Namely, the lightening conducting unit 10 is designed to conduct lightening current through its surface when lightening is conducted from lightening cloud at a start point of an upward streamer by corona discharge by positive electric charge.

A lightening protection unit 20 is positioned at a lower side of the lightening conducting unit and includes at least one conical skirt with its lower side getting wider and wider. The lightening protection unit 20 is designed to receive lightening current generated during lightening and to conduct to a lower side of a lightening rod. At this time, the lightening current flowing along a surface of a conical skirt is discharged due to an air gap that corresponds to an electric potential generated due to a voltage difference generated when induction of the air is destroyed by lightening current at a lower side of the skirt 21. A lot of lightening current disappears into the air by the above discharge.

An insulation unit 30 is installed at a lower side of the lightening protection unit 20 with its surface being formed of an insulation material layer, and with its interior being formed of a metallic material by which current is conducted to the lightening protection unit 20. Namely, the insulation unit 30 is designed to insulate the lightening conducting unit 10 and the lightening protection unit 20 that correspond to the upper side of the lightening rod from the ground and body for thereby preventing the positive ions of the ground from being directly conducted to the upper side of the lightening rod when thundercloud is generated. Even when an insulation part is formed at one side of the lightening rod, a lot of lightening current generated during lightening is conducted to a metallic body through the lightening protection unit 20 and disappears into the air.

The body 40 of the lightening rod is positioned at a lower side of the insulation unit and is connected with the ground for thereby conducting the lightening current into the ground. An ion generation circuit 50 is installed in the interior of the body 40 for generating lots of positive ions.

As shown in FIG. 2, at least one lower tip 41 may be formed at one side of the body 40 of the lightening rod. The lower tip 41 is capable of discharging lots of positive ions in a streamer type when positive ions are increased as the surface of the lightening rod is changed to positive polarity by the ion generation circuit 50, and the increased ions are gathered at the surface of the lower tip for thereby radiating the positive ions.

As shown in FIG. 4, the electric potential generation unit 51 of the ion generation circuit is designed to detect a magnetic field variation in real time between the ground and the thundercloud generated by electrostatic induction when thundercloud is generated. The electric potential generation unit 41 of the same is designed to generate induction current together with an energy storing unit 53. Namely, an upper side of the electric potential generation unit 51 is connected with the lightening conducting unit 10 or the lightening protection unit 20, and a lower side of the same is connected with the other side of a capacitance in which one side of the energy storing unit 53 is connected with the ground. A first inductance 52 is formed in the interior of the electric potential generation unit 51. The negative ions in the air generated based on the change of magnetic field intensity pass through the first inductance and are moved to the other side of a capacitance 54 for thereby generating induction current. At this time, when thundercloud is increased, and the magnetic field between the air and the ground is increased, the speed of electric charges passing through the first inductance is also increased.

In addition, one side of the energy storing unit 53 is connected with the ground having the positive polarity, and the other side of the same is connected with the electric potential generation unit 51 that receives negative electric charge from the air, so that the current passed through the electric potential generation unit 41 is charged in the capacitance 54. At this time, the speed of the electric charge supplied from the electric potential generation unit 51 having increasing thundercloud is increased, and the induction current generated at the electric potential generation unit 51 is maintained until the electric charge is charged in the capacitance 54.

One side of the swing unit 56 is connected with the energy storing unit 53, and other side of the same is connected with the lightening conducting unit or lightening protection unit 20 that forms an upper side of the lightening rod with an on/off circuit being installed in the interior of the switching unit 56. Namely, when the electric charge is fully charged in the capacitance 54 of the energy storing unit, the on circuit is activated, so that the electric charge stored in the capacitance 54 is moved to the upper side of the lightening rod.

When the electric charge stored in the capacitance 54 is consumed, the off circuit is activated, so that the electric charge is charged again in the capacitance 54.

At this time, the on/off circuit of the switching unit 56 is operated until the magnetic field intensity is generated with a certain level. The opening and closing time of the on/off circuit is controlled based on the magnetic field intensity changed in response to the increase of the thundercloud. The change of the magnetic field intensity may be measured by a voltage sensor or may be used by measuring the current or voltage generated by the electric potential generation unit. As the magnetic field intensity is increased, the operation time of the on/off circuit becomes faster, so that the electric charge stored in the capacitance 54 of the energy storing unit is used as current. Therefore, when a magnetic field intensity exceeding a certain level is formed, only the on circuit of the switching unit is operated, so that the electric charge stored in the capacitance 54 is moved to the upper side of the lightening rod.

One side of a power generation unit 57 is connected with the switching unit 56, and the other side of the same is connected with the lightening conducting unit 10 or the lightening protection unit of the lightening rod. The power generation unit 57 includes second and third inductances 58 and 59 for oscillating the current flown into the interior and generating high voltage. The current inputted as the on circuit of the switching unit is activated is amplified with high voltage by a third inductance 59 through the second inductance 58 and is flown to the lightening conducting unit 10 or the lightening protection unit 20 that correspond to the upper side of the lightening rod.

The operation of the lightening rod according to the present invention will be described with the processes before and after lightening is generated.

[Before Lightening is Generated]

When thundercloud having negative polarity capable of generating lightening is formed, the ground is induced with positive polarity that is opposite to the thundercloud, so that magnetic field intensity having over 5 KV/m is generated between the thundercloud and the ground. The magnetic field intensity with respect to the ground gets higher and higher as the intensity of thundercloud is increased.

The negative electric charge in the air formed by the change of the above magnetic field intensity passes through the first inductance for thereby generating induction current. The generated induction current is stored into the capacitance of the energy storing unit until a certain amount of electric charge is charged.

The electric charge charged in the capacitance 54 of the energy storing unit passes through the switching unit 56 when the switch 56 of a pulse converter is turned on and the second inductance of the oscillator. The electric charge is amplified with high voltage by the third inductance 59 and is moved to the upper side of the lightening rod, so that the surface of the lightening conducting unit or the lightening protection unit is changed with the positive polarity for thereby inducing the positive ions.

At this time, since the surface of the lightening conducting unit or the lightening protection unit is connected in a sequence of the ground→the switching unit 56 →the oscillator 57 →the lightening conducting unit 10 and the lightening protection unit 20, the positive ion of the ground having the positive polarity is mixed with the positive ions amplified by the oscillator 57, so that lots of positive ions are generated. When the positive ions are saturated, the positive ions are radiated from the surface. When the switch 56 of the switching unit is turned off, no more positive ions are provided to the upper side of the lightening rod positioned at the upper side of the switching unit, so that the quantity of ions is decreased.

As the thundercloud is increased, when voltage exceeding a certain level is detected at the electric potential generation unit 51, the on circuit of the switch 56 of the switching unit is operated, and a lot of high voltage is continuously generated by the oscillator 57, so that lots of position ions can be discharged into the air. In addition, as the voltage is increased at the electric potential generation unit, the opening and closing time of the on/off circuit of the switching unit 56 is decreased.

The sequential process of the electric potential generation unit 51→the energy storing unit 53→the switching unit 56→the oscillator 57 is repeatedly performed. In this process, when thundercloud is increased, the saturated positive ions at the surface of the lightening rod is continuously radiated into the air from the surface of the lightening rod for thereby inducing lightening from the thundercloud.

[After Lightening is Generated]

When lightening is conducted at the lightening conducting unit 10 of the lightening rod, the lightening current is conducted to the lightening protection init 20 through an outer surface of the lightening conducting unit 10, and is conducted to a lower side of the skirt 21 along the surface of the lightening protection unit 20 with the skirt 21 being widened in a conical shape.

A slight electric potential difference is generated at a space by the air gap formed at the lower side of the skirt 21, and the lightening current reached at the lower side of the skirt 21 is discharged by a slight electric potential difference. After the discharge occurred, the conduction of the lightening current is deteriorated and decreased.

The decreased lightening current is conducted into the ground through conductive cable connected with the body 40 of the lightening rod.

Almost lightening current is conducted into the ground along the surface of the lightening rod and disappears, but a part of the same may be conducted into the interior of the lightening rod. The lightening current conducted into the interior of the lightening rod disappears in a sequence of the oscillator 57→the switching unit 56→the energy storing unit 53→the ground 60.

[First Test Example of the Present Invention]

The earlier discharge time difference test was requested to the Korean electricity research center with respect to the ion radiation type ESE lightening rod SK-660 fabricated according to the present invention and the conventional lightening rod. In the test condition, voltage was supplied under the conditions of opening and closing impact voltage of −540 kV when temperature was 29.7° C., moisture was 69.4%, and atmospheric pressure was 1,00 hPa, and the applied waveform of 200/2350 µs. In the above state, the discharge time of the lightening rod was measured, and the measured value was converted with a reference waveform of 650 µs for thereby computing the discharge time difference. The result of the tests is shown in the table 1.

[Table 1]

| Samples | Average discharge time | Average discharge time converted with reference waveform of 650 µs | Discharge time difference |
|---|---|---|---|
| SK-660 | 101.6 µs | 330.2 µs | 110.5 µs |
| Conventional | 135.6 µs | 440.7 µs | |

| Samples | Average discharge time | Average discharge time converted with reference waveform of 650 µs | Discharge time difference |
|---|---|---|---|
| lightening rod | | | |

As seen in the table 1, the conventional lightening rod has the average discharge time of 135.6 µs, and the average discharge time of the lightening rod according to the present invention is 101.6 µs. Namely, the above result shows that it is possible to induce the lightening faster than the conventional lightening rod. The lightening rod according to the present invention is capable of decreasing the time by 110.5 µs as compared to the conventional art for thereby effectively inducing lightening.

As described above, in the present invention, it is possible to increase the positive ions a lot at the surface of the lightening rod as thundercloud is developed thereby effectively inducing lightening from thundercloud.

In addition, an induction current is generated using the negative ions in the air generated as the thundercloud of negative polarity is generated. The positive ions are significantly increased at the surface of the lightening rod for thereby activating corona discharge, so that lightening can be inducted within earlier time period.

In addition, the flow of the current generated at the electric potential generation unit is limited while electric charge is charged into the capacitance of the energy storing unit, so that it is possible to prevent earlier corona discharge at the lightening rod.

Furthermore, the inducing distance of thundercloud can be increased by increasing the forward moving distance of the position ions discharged from the surface, while regularly adjusting the corona discharge at the surface of the lightening rod.

In the present invention, since the voltage generated by thundercloud is used, it is not needed to use external power.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. A streamer discharge type lightening rod capable of generating lots of ions, comprising:
   a lightening conducting unit that is formed of a conductive tip at an upper most portion of a lightening rod;
   a lightening protection unit that is installed at a lower side of the lightening conducting unit and has at least one conical skirt with a lower side of the at least one conical skirt being wider than an upper side of the at least one conical skirt;
   an insulation unit that is installed at a lower side of the lightening protection unit and is formed of an insulation material on its surface and has an internal portion formed of a metallic material with a current being supplied to the lightening protection unit; and
   a body that is installed at a lower side of the insulation unit with its lower side being connected with the ground for conducting lightening current to the ground and has an ion generation circuit installed in the interior of the body for generating ions,
   wherein said ion generation circuit includes:
   an electric potential generation unit for detecting a magnetic field variation in real time between the ground and thundercloud generated by electrostatic induction when thundercloud is developed and for generating induction current;
   an energy storing unit for charging electric charge into the interior of the energy storing unit when induction current is generated at the electric potential generation unit with one end of the energy storing unit being connected with the ground, and with the other end of the energy storing unit being connected with the electric potential generation unit;
   a switching unit that opens the circuit when electric charge is fully charged into the energy storing unit and moves the electric charges of the energy storing unit to an upper side of the lightening rod and closes the circuit when the electric charges are charged into the energy storing unit with one side of the switching unit being connected with the energy storing unit, and with the other side of the switching unit being connected with an upper side of the lightening rod; and
   an oscillator that amplifies the current inputted as the switching unit is opened and generates a high voltage in the interior of the oscillator and induces the high voltage to the upper most side of the lightening rod with one side of the oscillator being connected with the switching unit, and with the other end of the oscillator being connected with the upper most side of the lightening rod.

2. The rod of claim 1, wherein said electric potential generation unit includes a first inductance at one side of the electrical potential thereby generating induction current.

3. The rod of claim 1, wherein said energy storing unit is a capacitance.

4. The rod of claim 1, wherein said oscillator includes a second inductance and a third inductance thereby amplifying the current inputted from the switching unit.

5. The rod of claim 1, wherein said opening and closing time of an on and off circuit of the switching unit is adjusted in cooperation with a magnetic field intensity changed based on the increase of thundercloud, and when a magnetic field intensity exceeding a certain level is formed, the on circuit of the switching unit is operated.

6. The rod of claim 1, wherein at least one lower tip is further provided at one side of a portion of the lightening rod.

* * * * *